H. E. ERWIN & H. M. GORSLINE.
VENDING MACHINE.
APPLICATION FILED APR. 21, 1913.

1,097,173.

Patented May 19, 1914.
5 SHEETS—SHEET 1.

Witnesses:
L. L. Markel
O. F. Lux

Inventors:
H. E. Erwin
H. M. Gorsline
By their Attorneys,
Sutherland & Audum

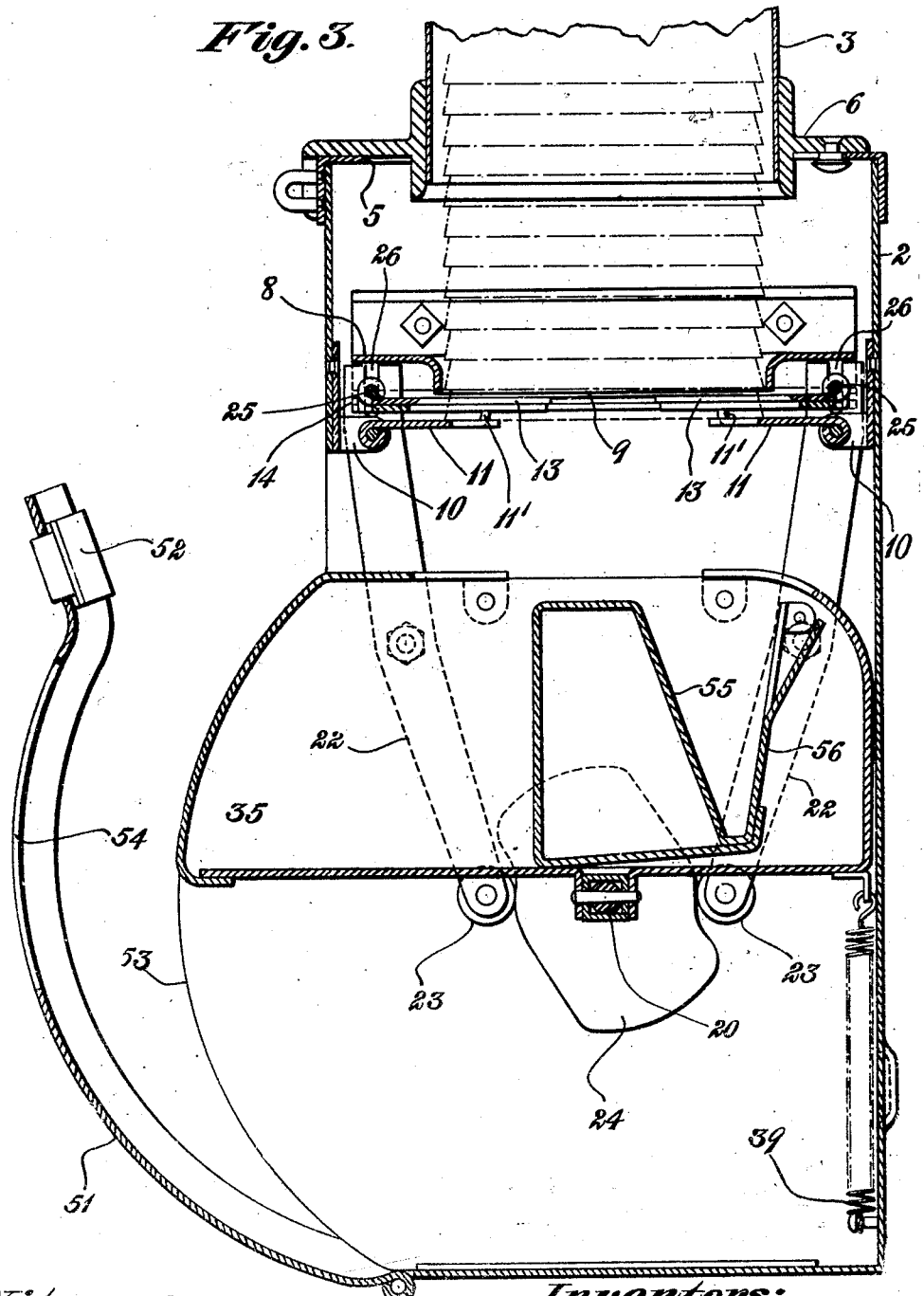

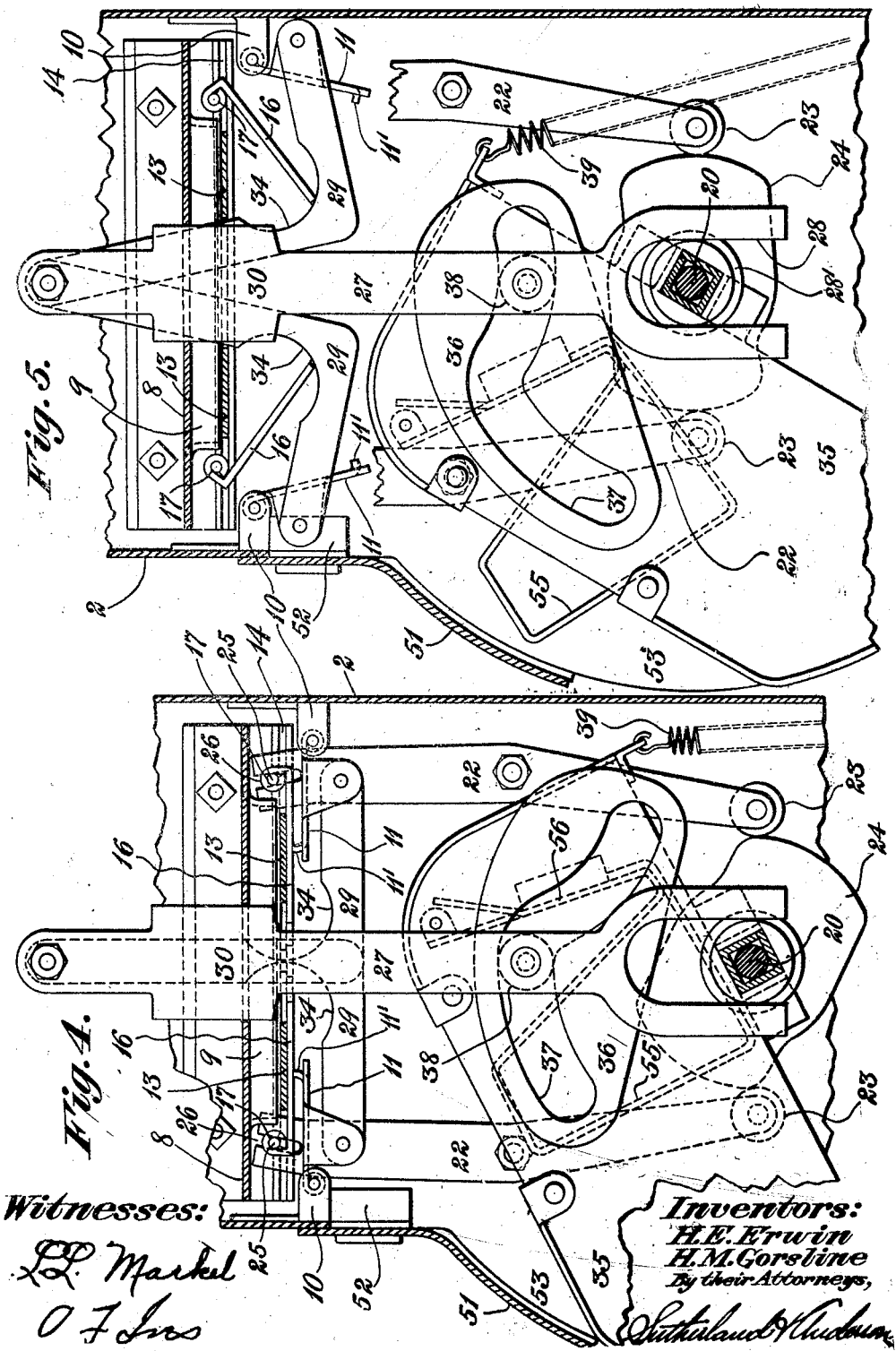

H. E. ERWIN & H. M. GORSLINE.
VENDING MACHINE.
APPLICATION FILED APR. 21, 1913.
1,097,173.
Patented May 19, 1914.
5 SHEETS—SHEET 4.
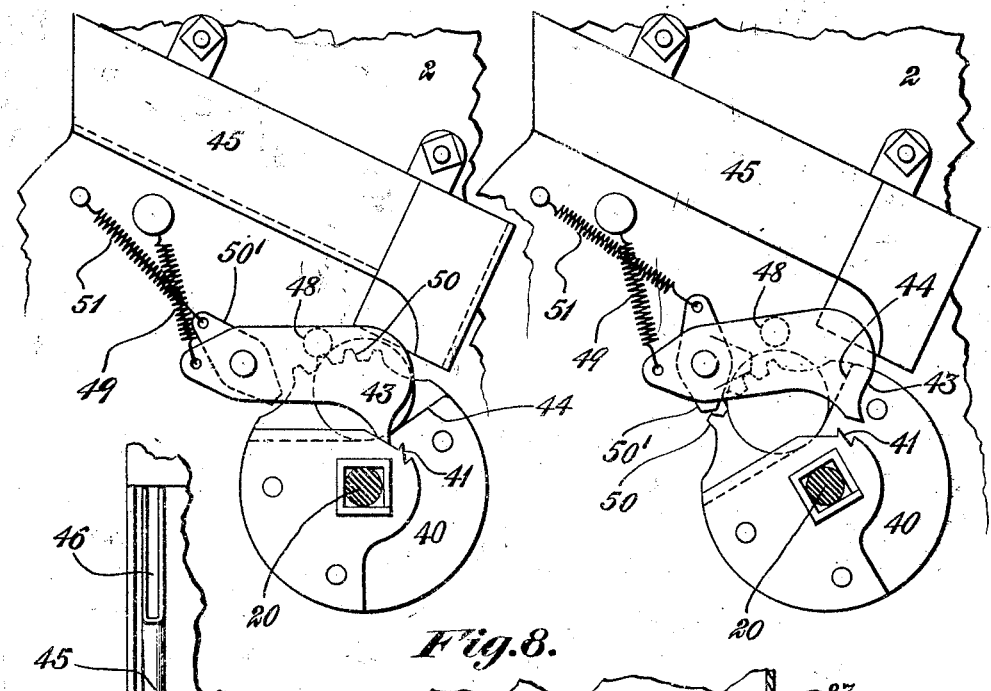
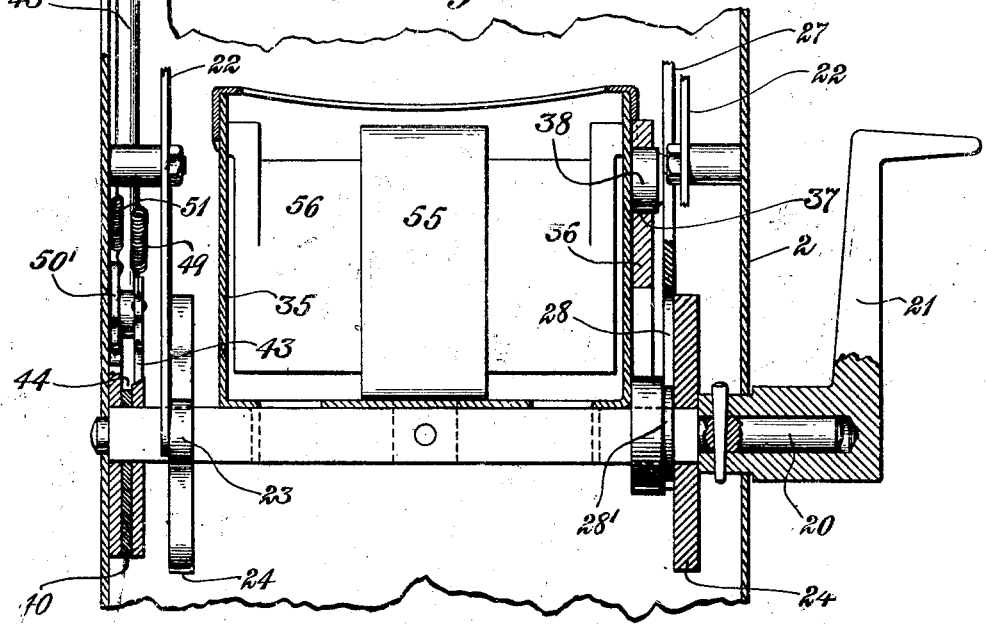
Witnesses:
Inventors:
H. E. Erwin
H. M. Gorsline
By their Attorneys,

UNITED STATES PATENT OFFICE.

HERBERT E. ERWIN, OF NEW BRITAIN, AND HATHAWAY M. GORSLINE, OF BRISTOL, CONNECTICUT, ASSIGNORS TO THE NEW BRITAIN MACHINE COMPANY, OF NEW BRITAIN, CONNECTICUT, A CORPORATION OF CONNECTICUT.

VENDING-MACHINE.

1,097,173.  Specification of Letters Patent.  Patented May 19, 1914.

Application filed April 21, 1913. Serial No. 762,464.

*To all whom it may concern:*

Be it known that we, HERBERT E. ERWIN and HATHAWAY M. GORSLINE, citizens of the United States, residing at New Britain and Bristol, respectively, in the county of Hartford and State of Connecticut, have invented certain new and useful Improvements in Vending-Machines, of which the following is a specification.
This invention relates to vending-machines, among the principal objects of the invention being the provision of an apparatus of this character which is simple in construction, effective in action and by which the articles to be vended can be accurately delivered.

Figure 1:
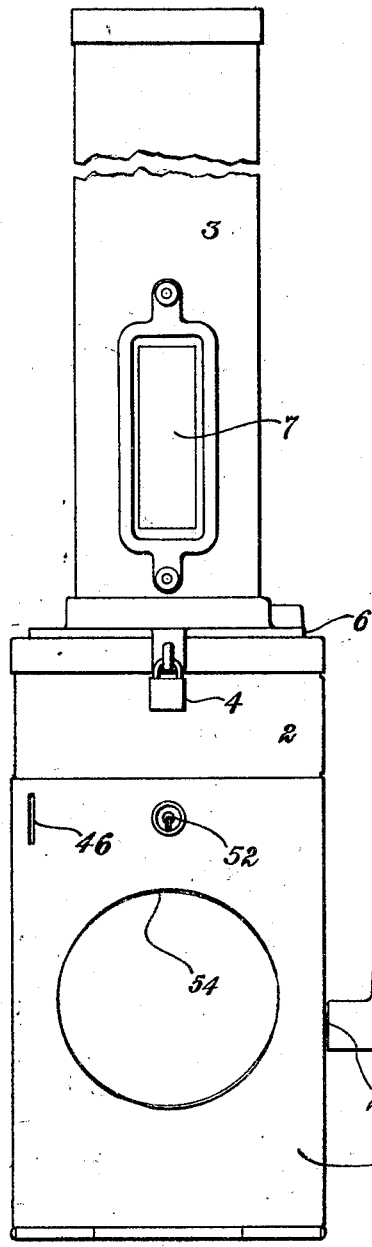
Figure 2:
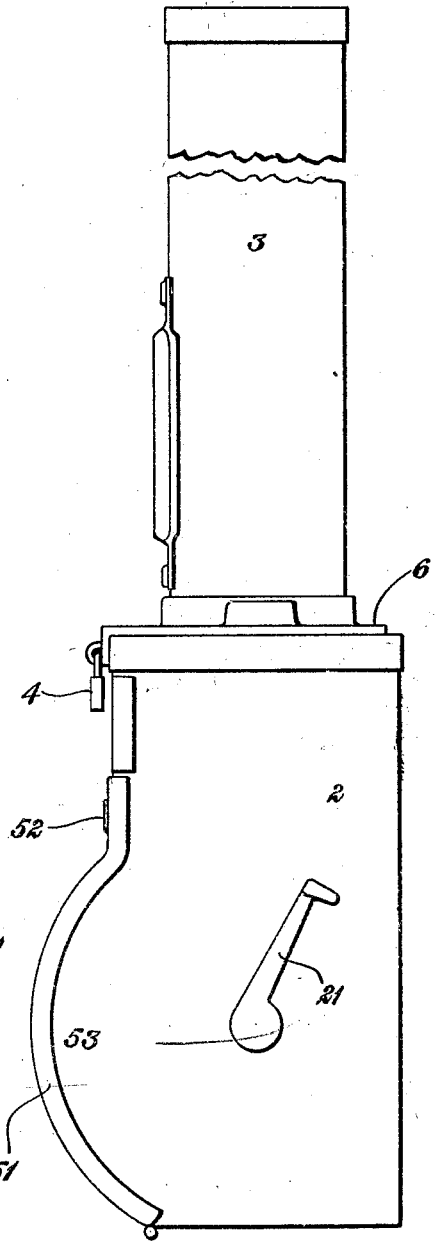
Figure 9:
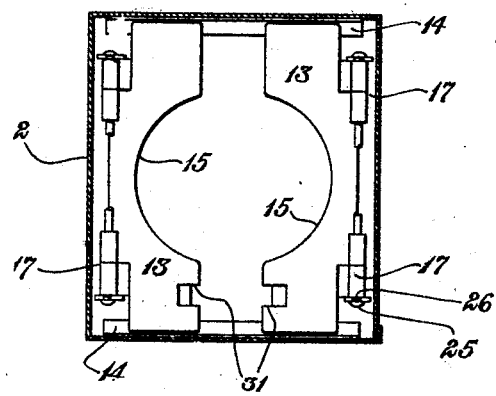
Figure 10:
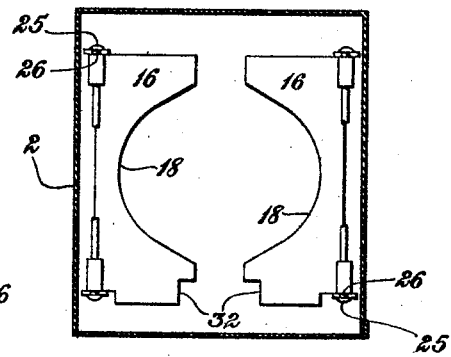
Figure 11:
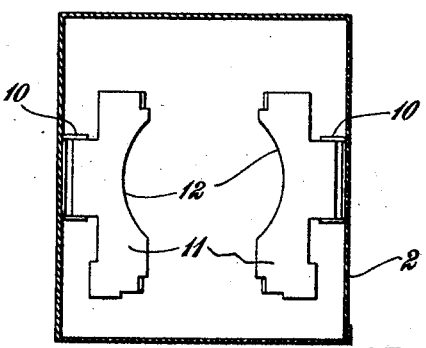
Figure 12:
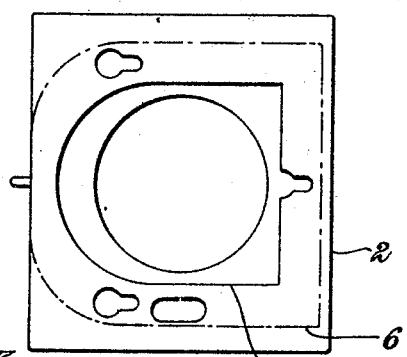
Figure 13:
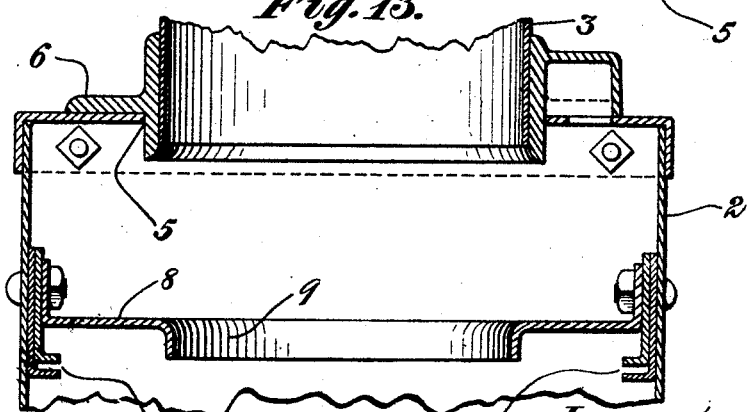

The invention possesses other features of novelty and advantage which with the foregoing will be set forth at length in the following description wherein we will fully disclose that one of the several convenient forms of embodiment of the invention which we have selected for illustration in the drawings accompanying and forming part of the present specification. We do not limit ourselves to this showing; we may depart therefrom in several respects within the scope of the invention defined by the claims following said description.
Referring to said drawings: Figure 1 is a front elevation of a vending apparatus involving our invention. Fig. 2 is a side elevation of the same. Fig. 3 is a vertical sectional view of the lower portion of the machine, with the coin-controlled mechanism omitted. Figs. 4 and 5 are similar views of the cup-supporting, withdrawing, and delivering members in different positions. Figs. 6 and 7 are vertical sectional views of coin-controlled mechanism. Fig. 8 is a sectional front elevation of a cup-receiving-and-delivering member, coin-controlled mechanism and certain coöperating parts hereinafter more fully described. Fig. 9 is a horizontal section through the casing just below the magazine showing in top plan a pair of gripper members. Fig. 10 is a like view, the parts shown in plan being the cup-detaching members. Fig. 11 is a similar view, the stack-supporting members being in top plan. Fig. 12 is a top plan view of the lower portion of the casing, and, Fig. 13 is a transverse vertical section through the casing at the junction of the body portion thereof and magazine, the movable parts inclosed thereby being omitted.

Like characters refer to like parts throughout the several views which are on different scales.

A vending machine comprising our invention can be employed with advantage for receiving and delivering articles of various kinds, although it is of particular utility when used for containing and dispensing drinking cups which are generally arranged in a stack of nested cups.

While the machine illustrated is provided with check or coin controlled means for governing the dispensing or delivery mechanism of whatever character the same may be, this is not always necessary as the same could be dispensed with and the device used as what is known as a "free" machine.

The various parts of the machine are housed or inclosed in a suitable casing; that shown comprises the body portion 2 and the magazine 3 mounted on and rising from said body portion 2, the two parts being separably connected, and the magazine being normally prevented against removal from said body portion by a lock as 4. The stack of cups is placed in the magazine, the lower part of the stack extending into the body portion 2 where it is normally supported as will hereinafter appear. The top of the body portion 2 has an approximately central opening 5 to receive the lower portion of the magazine, the latter being furnished with an external flange 6 to rest on said top as shown best in Fig. 13. Said magazine also has in its front a sight-opening 7 covered with glass or some other transparent material by which it can be readily determined whether or not said magazine requires replenishing. Within the body-portion 2 and fastened thereto in some suitable manner as by bolting, is the shelf or platform 8 having a central opening 9 flanged along its wall in a downward direction, the lower portion of the stack extending through said opening, said shelf or platform serving to prevent undue lateral motion of the stack. The diameter of said hole or opening 9, however, is greater than the maximum diameter of the cups so as not to affect free downward movement of the stack or the ready and easy withdrawal of the lowermost cup therefrom, means being provided as will hereinafter appear to positively separate said lowermost cup from the remainder of the stack. Various means may be provided for sustaining the stack but we prefer that the support for this purpose be movable so that when said support is moved to ineffective or stack-freeing relation the lowermost cup thereof can be withdrawn at which time, the stack is supported above the lowermost cup or that to be withdrawn, by an independent stack support, which may for instance, consist of two slides for engaging under the second lowermost cup of the stack from opposite sides thereof.

The main support or that which normally carries the stack will now be set forth and for this purpose reference should be had to Figs. 4, 5 and 9. Within the body portion 2 are situated the brackets or bearings 10 to which are pivoted at their outer edges, the plates 11 of duplicate construction and which jointly present the main support for the stack, said plates 11 normally standing horizontally at which time the stack as a whole rests on them. By swinging said plates downward as will hereinafter appear, they are shifted away from the stack and out of the path of movement thereof so as not to interfere with the free removal of the lowermost cup as will hereinafter appear. These two plates have in their adjacent or opposite edges circular apertures 12, the lowermost cup of the stack resting on the two plates a short interval beyond said apertures, the distance between the apertured portions of said plates for this purpose being a little less than the maximum diameter of the cups. The auxiliary stack supporting means may also vary as to character, although companion slides as 13 answer satisfactorily in this connection, said slides being of duplicate construction and being movable toward and from each other, the body portion 2 being provided interiorly thereof with ways as 14 for supporting and guiding said slides. Said slides are apertured in their adjacent edges as at 15, the apertured portions of said slides being adapted to slide under the second cup from the lowermost end of the stack just at about the point that the plates 11 have been wholly freed from the stack, the said lowermost cup, after the main support has been moved away from the stack and after the auxiliary support has passed under the stack, being positively pulled away from its mates subsequent to which said lowermost cup passes into a cup-receiving-and-delivering member which as will hereinafter appear is movably mounted in some convenient manner, as by pivoting, although this is not in all cases necessary.

Between the plates 11 and the slides 13, are mounted the cup separating or withdrawing means which like the parts already described may also vary as to nature, but which are shown as consisting of the plates 16 which have a compound movement; that is said plates are movable toward and from each other along a straight path and are also capable of swinging movement, being adapted when they have traveled a predetermined distance toward each other to grip the lowermost cup and when swung downward to pull said lowermost cup from the stack so that it can drop into the cup-receiving-and-delivering member to which we have already made brief reference. In the construction shown, the cup-withdrawing members 16 are pivoted or hinged at their outer edges as at 17 to the stack-supporting slides 13 so that as said slides 13 are moved toward and from each other the cup-withdrawing members will move therewith, whereby when the parts 13 engage the stack, the parts 16 will simultaneously engage the stack or the lowermost cup thereof. The cup-withdrawing members are also cut out as at 18 along their opposite edges to grip the lowermost cup. It will be clear, therefore, that after the parts 13 have passed under the stack just above the lowermost cup and that after the parts 16 have gripped the lowermost cup thereof, if said parts 16 be swung downward they will positively pull the said lowermost cup away from the stack.

The mechanism for operating the several movable members thus far described may be of any desirable kind, although that shown and now to be described is satisfactory.

Mounted on the lower part of the body portion 2 is a shaft 20 which is manually-operable and which is also preferably coin-controlled. As will hereinafter appear this shaft and the cup receiving and delivery member carried thereby, have a limited amount of lost motion which is not sufficient, however, to effect, through the parts associated therewith, the pulling of the lowermost cup from the stack. On the full or complete advancing movement of said shaft, however, the cup will be withdrawn as will hereinafter appear. Said shaft may be operated in any desirable manner; for example by the crank-arm or lever 21 connected to that end thereof which projects from the casing as shown best in Fig. 8.

Mounted within the body portion 2 upon opposite sides thereof are the two pairs of levers 22 (Figs. 3 and 8), pivoted between their ends for rocking motion, their lower ends being preferably furnished with antifriction rollers 23 for engaging the operative surfaces of the double lobed cams 24 fastened to the rock-shaft 20 near the opposite ends thereof. It will be supposed that said rock-shaft is in its normal position and that through the coin-controlled means it is given a full advancing movement through the manipulation of the lever or crank-arm 21. On this action, the cams 24 will spread or separate the lower branches of the two sets of levers 22 and will cause their upper ends to approach. On the return movement of the rock-shaft 21 the motion just described is reversed. In the construction shown the slides 13 are connected with the upper ends of said levers 22, said slides being shown as having pins or studs 25 at their outer corners to fit in notches or between the branches or bifurcations 26 (Figs. 3 and 9) of said levers. When said shaft 20 is advanced by the crank 21 in the manner set forth, it will be clear that the two slides 13, through the intermediate levers 22 are moved toward each other so that they can move under the second cup of the stack. When the shaft 20 is returned to its original position, by spring means for example, the two levers 22 are simultaneously returned to their primary relations so as to move the two slides 13 from under the stack by reason of which the latter can settle onto its main support as will hereinafter appear, the lowermost cup as will be inferred, having in the interval been withdrawn. It will be understood that when the two slides 13 were moved toward each other, the two gripper members 16 were given a like movement to be brought into engagement with the lowermost cup of the stack and when moved relatively to their supporting members 13, could separate the lowermost cup from the stack.

Within the body portion 2 is the bar 27 (Figs. 4 and 5) which is vertically movable and which is forked at its lower end as at 28 to straddle and to be guided by a collar 28' on the shaft 20. To the upper ends of said bar or controlling member are pivoted the inner terminals of the angle or L-shaped levers 29, the outer terminals of said links or levers being pivoted to the plates 11 adjacent the centers of motion thereof. It will therefore be understood that when the bar or operating member 27 is drawn downward, the two links or levers 29 will be swung therewith so as to open or swing down the two plates 11 and carry the same entirely free of the stack, this motion being a rapid one and quicker than the movement of the cup detaching members 16 so that the plates 11 will be out of the way when the cup is to be pulled from place. The plates 11 are provided near their free edges with lugs 11¹ for normally engaging the members 16 as shown in Fig. 4 so that said members 16 cannot be accidentally swung down as they are caused to approach the stack. When the plates 11 however are swung down they free the members 16 so that the latter can also swing down to effect the removal of the lowermost cup. While the downward movement of the cup removing or withdrawing members 16 might be secured by gravity we prefer that such action be positive and for this purpose utilize the operating member or bar 27 which as shown has an actuating portion 30 consisting of an enlargement thereof and which as said bar is drawn downward engages the two members 16 to positively swing the same downward so that they will forcibly pull the lowermost cup from the stack. The slides 13 are notched in their adjacent edges as 31 (Fig. 9) to provide for the passage of said enlargement 30 and the two members 16 are also notched as at 32 (Fig. 10) to receive said operating member 27. As the latter is drawn downward, the enlargement or actuating portion 30 thereof will engage and then simultaneously swing down the two plates 16 and after said plates have moved a certain distance or until they are free of the cup, further movement thereof is secured by gravity, they traveling along the circular faces 34 near the elbows of the two levers 29 by reason of which latter condition, undue opening movement of said parts 16 is prevented.

A cup receiving-and-delivering member such as meets our requirement is that denoted in a general way by 35, the same as shown consisting of a pan-like part or receptacle suitably fastened to the shaft 20 between the ends thereof so that as said shaft is rocked said receptacle 35 partakes of the movements thereof. Fastened to the side of the receptacle 35 adjacent the operating member 27 is the cam-member 36 which may consist of a plate having a cam slot 37 to receive a stud 38, such as an antifriction roller, projecting inward from the operating member 27. The first part of the cam-slot 37 is ineffective being on an arc struck from the center of motion of the receptacle 35, by reason of which on the initial forward operation of said receptacle, the bar 27 will not be pulled down. The final part of said slot is the active portion thereof and when the stud or anti-friction roller 38 relatively rides into the same as said receptacle 35 is moved forward, the bar 27 is drawn down to effect the several functions already mentioned. The receptacle 35 is returned to its original position by suitable means, the spring 39 being shown for this purpose.

The coin-controlled means for governing the action of the dispensing mechanism may of course vary radically as to character, although that illustrated and now to be described has been found highly effective. As a matter of fact the coin-controlled mechanism might be wholly eliminated.

Fastened to the rock-shaft 20 is the disk 40 (Figs. 6, 7 and 8), which as shown consists of three sub-disks or plates suitably secured together for instance by riveting or otherwise. The innermost section or plate of the disk 40 is cut away the cut-away portion being toothed as at 41 to coöperate with the tooth of the locking pawl 43 pivoted between its ends within the body portion 2, the pawl tooth being normally a slight distance from the toothed portion 41 of the disk 40 so that said latter will move a short distance before its toothed portion 41 comes into contact with the pawl tooth, this distance, however, being not enough to effect the removal of a cup but sufficient to cause a coin provided there be one inserted in the machine, to move said pawl to unlocking position as will hereinafter appear. If there be no coin the pawl will therefore prevent full movement of the disk 40 and the parts connected therewith. The intermediate section of the disk is notched or recessed as at 44 to provide a seat for the coin which is usually a penny or one cent, this seat or recess being normally opposite the delivery opening of the fixed chute 45 within the body portion 2 and extending from the coin-slot 46 (Fig. 1) therein. It will be assumed that a cent has been passed through said slot 46. It rolls down the coin-chute 45 and falls from the latter into the seat or pocket 44. The locking pawl 43 is disposed within the cut away portion of the inner section of the disk 40, and it has an outwardly-extending pin 48 projecting across the pocket or seat 44 and normally in the path of the coin. It will be assumed that the proper coin is in the pocket 44 and that the disk 40 is being moved forward through the primary agency of the hand lever 21. As said disk moves forward the coin in said pocket by acting against the pin 48 lifts said pin and therefore the inner branch of the locking pawl an extent sufficient to carry the point or tooth of said pawl out of the path of movement of the toothed portion 41 of the disk 40 so that said disk can be given a complete movement at the conclusion of which the coin in the pocket 44 drops therefrom onto the bottom of the body portion 2. The pawl is constantly maintained in operative relation by suitable means as the spring 49 connected as shown, with the tail thereof.

Means are preferably provided for positively preventing backward movement of the disk 40 while the locking pawl is elevated as in case such backward movement could be accomplished at such time it might be possible to secure several cups for the price of one, and this means may also vary as to character although that shown and now to be described has met the required conditions. The outer section of the disk 40 is shown provided with several teeth 50 coöperative with the detent 50′ pivotally supported between its ends by the pivot of the latch or pawl 43 held in normal relation by a spring as 51 connected therewith. On the advance of the disk 40 in the manner set forth, the first tooth of the series of teeth 50 will engage the lower portion of said detent 50′ and will swing the same forward so that it can enter the space between the first and second of said series of teeth 50 to the left as shown by full lines in Fig. 7, backward movement of the disk and parts connected therewith being prevented as long as the detent 50′ is between any of the two teeth. As soon as the cup has been delivered into the receptacle 35 the detent 50′ will engage behind the last of the teeth 50, the coin in the meantime having passed from the pocket 44 so that the disk 40 can be returned by the spring 39 acting against the receptacle 35. On the return movement of the disk 40 the detent 50 will enter the spaces between said teeth 50 so that after said disk 40 and the parts connected therewith have commenced their backward or return movement it will not be possible to move them forward until after they have reached their original positions or practically so or at least up to the point where it is necessary to introduce a coin to obtain a second cup. Return movement of the parts thereof is prevented until they have made their full advancing movement and vice versa in view of which it is not possible to "beat" the machine.

The lower part of the body portion 2 is open on its forward side the opening being covered normally by the door 51 adapted to be held closed by a lock 52 and to fit against the wings 53 on the sides of said body portion as shown best in Figs. 1 and 2. Said door has a hand-hole 54 by which access can be had to the cup in the receptacle 35. As a matter of fact said cup is positively projected partly through said hole so that the user need not pass his hand therethrough. The front side of the receptacle is curved, its arc agreeing practically with that of the door 51 and this curved closed front side of the receptacle normally covers the hole 54 to make the apparatus sanitary, the receptacle as it is advanced uncovering said hole. In the receptacle 35 is a cup carrier as 55 which as shown consists of a skeleton-like member mounted for swinging movement in the receptacle 35. Said cup-carrier is tapered toward its top and near its bottom is provided with an arm 56 pivoted at its upper end to the upper rear side of the receptacle as shown best in Fig. 3. When a cup is separated from the stack it falls with its open or mouth side downward, over the cup-carrier 55 and as the receptacle 35 moves forward, the motion ordinarily being rather quick, the cup-carrier 55 will be swung to project the cup thereon partly through the hole 54.

While it is believed that the operation of the machine will be fully understood from the statements already made, it is nevertheless desirable to briefly refer to the same. It will be assumed that the parts are in their normal positions and that a coin has been inserted through the slot 46 into the chute 45. The coin rolls along said chute and passes therefrom into the pocket 44, so that if the hand-lever 21 be grasped and moved forward, the shaft 20 and hence the disk 40 will be advanced. As the disk 40 moves forward the coin therein by acting against the pin 48 lifts the locking pawl or latch 43 to permit full advancing movement of the disk 40, receptacle 35 and parts movable therewith. On the first part of the forward movement of the shaft 20, the two sets of levers 22 are rocked by the cams 24 on said shaft, so as to move the two slides 13 toward each other and under the second cup from the lower end, of the stack, to thus support said stack. As the slides 13 move toward each other they carry the cup-detaching members 16 therewith, the latter engaging the lowermost cup of the stack just at about the time the second cup is engaged by the slides 13. During this motion of the parts, the receptacle 35 will have been moved approximately to the position shown in Fig. 4. On the continued advance of said receptacle beyond this point, the bar 27 is pulled downward (Fig. 5) and as said bar thus moves it rapidly swings the plates 11 through the levers 29 away from the stack and also by its enlargement 30 swings down the slides 16 so that the latter pull the lowermost cup from the stack, whereby said lowermost cup can pass out onto the cup-carrier 55. After the coin in the disk 40 has been discharged therefrom, the spring 39 will return the receptacle 35, shaft 20 and disk 40 to their primary positions. As the receptacle 35 is swung back the cam member 36 thereon thrusts the bar 27 upward this motion commencing on the initial return movement of the receptacle 35 and continuing until the receptacle about reaches the position shown in Fig. 4 at which point the bar 27 will have reached the extreme of its upward movement and will, through the levers 29, have moved the two plates 11 to their horizontal or operative positions, the plates 11 in turn swinging the members 16 to their original positions beyond which point the slides 13 are slid outward away from the stack by the joint action of the levers 22 and cams 24. As soon as the slides 13 are disengaged from the stack the latter settles onto the plates 11.

While the stack supporting and gripping devices or those which support the stack at superposed places, and remove the lowermost portion of the stack are each shown composed of several parts, this is not always necessary.

What we claim is:

1. In a cup-vending machine, the combination of main and auxiliary stack-supporting means, cup-detaching means, and mechanism for moving the main stack-supporting means out of stack-supporting relation, for moving the auxiliary stack-supporting means and the cup-detaching means into the space between rim portions of superimposed cups, and for operating the cup-detaching means relative to the auxiliary stack-supporting means to withdraw a portion of the stack.

2. In a cup vending machine, the combination of a stack supporting element, a cup detaching element, and mechanism for moving the two elements into the space between a pair of superimposed cups and for then moving the cup detaching element with respect to the cup supporting element to positively remove a portion of the stack.

3. In a cup vending machine, the combination of a stack supporting element, a cup detaching element, and mechanism for moving the two elements simultaneously into the space between a pair of superimposed cups and for then moving the cup detaching element independently of the cup supporting element to positively remove a portion of the stack.

4. In a cup vending machine, the combination of a stack supporting element, a cup detaching element, and mechanism for moving the two elements simultaneously into the space between a pair of superimposed cups and for then moving the cup detaching element independently of the stack supporting element in the direction of the longitudinal axis of the stack, to positively remove a portion of said stack.

5. In a drinking cup machine, the combination of a pair of elements, and mechanism for simultaneously moving said elements into the space between the rim portions of superimposed cups and for moving one of the elements with respect to the other to effect the separation of a cup and to support the stack above the cup thus separated.

6. The combination of a support for a stack of nested drinking cups, a pair of slides, means for moving said slides toward each other and under the second lowermost cup of the stack and for also moving the said support out of engagement with the stack, gripping means movable with and supported for swinging movement by said slides, to grip the lowermost cup at about the time said slides are under said second lowermost cup, and means for swinging said gripping means after said first support has freed the stack, to separate the lowermost cup from the remainder thereof.

7. The combination of a swinging support for a stack of drinking cups, a second and slidable support for the stack, means for sliding the second support under the second lowermost cup of the stack and for swinging the first support away from the stack at substantially the same time, cup gripping means movable with the slidable support, to engage the lowermost cup at approximately the time the slidable support is in stack supporting relation, and means for imparting a swinging movement to said gripping means to cause the same to pull the lowermost cup of the stack therefrom and after said cup has been freed by the first support.

8. The combination of a pair of swinging members to normally support a stack of nested drinking cups, a pair of slides, means for moving said slides toward each other and between the lowermost and second lowermost cups of the stack and for also swinging said swinging members out of contact with the stack, gripping members coöperative with each other, supported for swinging movement by said slides, to engage the lowermost cup of the stack at about the time said slides are under said second lowermost cup, and means for imparting a swinging motion to said gripping members at about the time said swinging members have freed the stack.

9. The combination of a pair of swinging plates to normally support a stack of nested drinking cups, a pair of slides, means for moving said slides into position to support the stack and for also swinging said plates out of contact with the stack, gripping members coöperative with each other, supported for swinging movement by said slides, to engage the lowermost cup of the stack at about the time said slides are in stack supporting relation, and means for imparting a swinging movement to said gripping members at about the time said plates have freed the stack to cause said gripping members to separate the lowermost cup from the stack.

10. The combination of a support for a stack of nested drinking cups, a movably mounted cup receiving and delivering member, means connected with said cup receiving and delivering member for moving said second support into stack supporting relation during the first period of advancing movement thereof, cup detaching means, and means connected with said cup receiving and delivering member for moving the first support into stack freeing relation and for operating said cup detaching means to detach the lowermost cup of the stack during the second period of advance of said cup receiving and delivering member.

11. The combination of a support for a stack of nested drinking cups, a second support for the stack, a swinging cup receiving and delivering member, means connected with said cup receiving and delivering member for moving said second support into stack supporting relation during the initial part of the advancing movement thereof, cup detaching means, and means connected with said cup receiving and delivering member, for moving the first support into stack freeing relation and for operating said cup detaching means to detach the lowermost cup of the stack during the second period of the advancing movement of said cup receiving and delivering member.

12. The combination of a support for a stack of nested drinking cups, a second support for the stack, a swinging cup receiving and delivering member, means involving a cam device, operable by said cup receiving and delivering member for moving said second support into stack supporting relation during the first part of the advancing movement thereof, cup detaching means, and means also involving a cam, connected with said cup receiving and delivering member, for moving the first support into stack freeing relation and for operating said cup detaching means to detach the lowermost cup of the stack, during the second part of the advancing movement of said cup receiving and delivering member.

13. The combination of a pair of swinging plates for jointly supporting a stack of nested drinking cups, a pair of slides, levers connected with said slides, a cup receiving and delivering member mounted for swinging movement, a cam connected with said cup receiving and delivering member, for operating said levers to move said slides toward each other and into stack supporting relation, gripping devices supported for swinging movement by the respective slides, a bar, said cup receiving and delivering member having means for advancing said bar, and the bar being adapted to operate said gripping devices to cause the same to separate a cup from the stack, and means connected with said bar for swinging said plates away from the stack on the advance of said bar.

14. The combination of a casing, means in the casing for supporting a stack of nested drinking cups, a cup receiving and delivering member movably mounted in the casing, means connected with said cup receiving and delivering member for separating a cup from the stack, and a cup carrier to receive the cup thus separated from the stack, mounted in said cup receiving and delivering member and automatically shiftable by and on the movement of the latter.

15. The combination of a casing having an opening, means in the casing for supporting a stack of nested drinking cups, a movably mounted cup receiving and delivering member movable to cover and uncover in alternation said opening, and means operable by said cup receiving and delivering member for separating a cup from the stack for movement into said cup receiving and delivering member, on the advancing movement of the latter.

In testimony whereof we affix our signatures in presence of two witnesses.

HERBERT E. ERWIN.
HATHAWAY M. GORSLINE.

Witnesses:
 HEATH SUTHERLAND,
 FLORA STRONG.